United States Patent [19]
Amstutz et al.

[11] Patent Number: 5,771,867
[45] Date of Patent: Jun. 30, 1998

[54] CONTROL SYSTEM FOR EXHAUST GAS RECOVERY SYSTEM IN AN INTERNAL COMBUSTION ENGINE

[75] Inventors: Alois Amstutz, Knonau, Switzerland; James J. Faletti, Spring Valley, Ill.

[73] Assignee: Caterpillar Inc., Peoria, Ill.

[21] Appl. No.: 888,167

[22] Filed: Jul. 3, 1997

[51] Int. Cl.$^6$ ............................ F02M 25/07; F02B 33/44
[52] U.S. Cl. ...................... 123/569; 60/605.2; 123/559.2
[58] Field of Search ................................... 123/568, 569, 123/571, 559.2; 60/602, 605.2

[56] References Cited

U.S. PATENT DOCUMENTS

| | | | |
|---|---|---|---|
| 4,466,416 | 8/1984 | Kawamura | 123/569 |
| 4,561,407 | 12/1985 | Jaussi et al. | 60/602 |
| 4,702,218 | 10/1987 | Yoshioka et al. | 123/559.2 |
| 4,723,525 | 2/1988 | Fried et al. | 123/559.2 |
| 5,052,362 | 10/1991 | Jenny et al. | 123/559.2 |
| 5,201,300 | 4/1993 | Iiyama | 123/569 |
| 5,284,123 | 2/1994 | Dones | 123/559.2 |
| 5,601,068 | 2/1997 | Nozaki | 123/569 |
| 5,682,864 | 11/1997 | Shirakawa | 123/569 |

*Primary Examiner*—Willis R. Wolfe
*Attorney, Agent, or Firm*—Robert J. Hampsch

[57] ABSTRACT

A system and method for controlling an exhaust gas recirculation system in an internal combustion engine having two or more actuating devices on a supercharger-type pressure-charged internal combustion engine, or, in a turbocharger equipped pressure-charged internal combustion engine. In the disclosed embodiments, the actuating devices may include a variable gas pocket valve, an air intake throttle valve, an exhaust gas recirculation valve, a turbocharger back pressure valve, or the adjustable turbine blades in a variable gas turbine. In the disclosed embodiments, the control system includes a pair of actuators operatively coupled to an engine controller. The second actuator is operatively responsive to the first actuator when the first actuator command signal exceeds prescribed actuator limits. However, when the first actuator is commanded or operating within the prescribed actuator limits, the variance or feedback signal is zero and the second actuator operates more or less independently of the first actuator.

24 Claims, 4 Drawing Sheets

CONTROL SYSTEM FOR EXHAUST GAS RECOVERY SYSTEM IN AN INTERNAL COMBUSTION ENGINE

TECHNICAL FIELD

The present invention relates to emission control system for an internal combustion engine, and more particularly, to exhaust gas recovery control system and apparatus for internal combustion engines which will minimize NOx and other emissions while minimizing particulate matter emissions from internal combustion engines.

The present invention generally relates to a system and technique for controlling a pair of actuators in an internal combustion engine and, more particularly, is concerned with an engine control strategy for improving the responsiveness and operating characteristics of the actuators.

BACKGROUND ART

Exhaust gas re-circulation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas re-circulation technique primarily involves the re-circulation of exhaust gas by-products into the intake air supply of the internal combustion engine. This exhaust gas thus reintroduced to the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

However, it is necessary to carefully control the proportion of re-circulated exhaust gas to intake air. For example, while a greater proportion of exhaust gas may be re-circulated at low load levels, it is necessary to ensure that the proportion of re-circulated exhaust gas does not become excessive, causing the engine to stop due to a lack of sufficient oxygen to mix with the fuel so as to permit combustion. On the other hand, if the proportion of exhaust gas re-circulated at full engine load is excessive, the power output of the internal combustion engine is reduced, and the engine will typically emit undesirable quantities of smoke and particulate matter due to unsatisfactory combustion in the engine cylinders. Therefore, it is clear that the exhaust gas re-circulation process is desirably tightly controlled.

Another technique useful in the control and reduction of undesirable emissions from internal combustion engines is the use of pressure-charged intake air. This permits the use of relatively smaller cubic displacement and lighter weight internal combustion engines in mobile equipment, reducing in turn the specific fuel consumption of the vehicle and overall mass of the vehicle necessary to perform a given function. In addition to the benefits of reduced size and mass, the typical pressure-charging device may be controlled to provide improved emissions characteristics. Pressure-charging machines suitable for such applications include the exhaust gas driven turbocharger which is comprised typically of an exhaust gas driven turbine linked to a compressor disposed in the intake air stream to provide compression of the intake air. One way of controlling a turbocharger is to provide a gate which controls exhaust gas flow and gates exhaust gas to bypass the exhaust gas turbine and control the charging rate of the turbocharger so that the maximum pressure limits of the associated internal combustion engine are not exceeded. Another device particularly suited for such pressure-charged internal combustion engines is the gas-dynamic pressure-wave supercharger. This pressure-wave supercharger is particularly well suited for use in diesel-type internal combustion engines for such applications, due to the fact that this type of supercharger provides a rapid response to changing load requirements and provides a high charging rate in the lower and middle ranges of operating speeds. Furthermore, since the exhaust gas and the intake air are in direct contact in such a machine, there is a degree of mixing therebetween which desirably varies according to the load placed on the internal combustion engine apparatus. For example, at full load the supercharger is typically over-scavenged to the point where a greater amount of air is compressed and is available to the engine than is required, permitting a complete scavenging of the exhaust gas from the supercharger. However, at less than full load and as the load decreases, the amount of available intake air likewise decreases so that at low and partial loads the supercharger is under-scavenged and permits a portion of the exhaust gas to be fed to the internal combustion engine along with the intake air. This characteristic is generally desirable and works in conjunction with the emission controls of the internal combustion engines. It is typically insufficient to provide an adequate control of emissions as the legal standards and emissions standards are progressively tightened to permit reduced vehicle emissions. Furthermore, the uncontrolled re-circulation of exhaust gas into the compressed intake air via the supercharger can adversely affect the operation of the internal combustion engine at low speed and low load conditions such as idling.

One means of controlling the scavenging of exhaust gas by-products from the supercharger is the provision of a gas pocket in the gas casing between the high pressure exhaust gas duct and the low pressure exhaust gas duct. This is typically done in conjunction with an expansion pocket provided in the air side casing of the supercharger to improve control of the low pressure scavenging of the expanded exhaust gas from the supercharger rotor. It is of course possible to provide and uncontrolled flow of exhaust gas to the gas pocket. As the static pressure in the gas pocket is the same as the pressure in the exhaust gas duct, this is called a static gas pocket feed. A variable gas pocket is another and better method of providing exhaust gas to the gas pocket by way of a passage from the exhaust gas duct wherein a valve is provided in the passage to provide a controllable flow of the exhaust gas to the gas pocket.

One method of controlling the operation of the valve in such a variable gas pocket apparatus is by way of a temperature-responsive bimetal flap. The flap operates in response to increasing exhaust gas temperature to progressively close and decrease the flow of exhaust gas into the gas pocket. Therefore, as the load on the internal combustion engine increases and the exhaust temperature rises, the amount of exhaust gas provided to the gas pocket is progressively reduced, and the amount of exhaust gas energy available for operating the supercharger rotor is progressively increased. Since the supercharger in this situation is progressively tending toward the high load, over-scavenged condition, the scavenging effect of the gas pocket is neither required nor desired.

It is also known to provide a valve for the gas pocket which is operated by an actuator responsive to a controller for operating the motor to provide valve positions at various engine operating and load parameters as selected according to pre-determined characteristic curves. As the legal emission standards have become more stringent, however, it has become increasingly desirable to integrate the control functions of the engine with the emission control system to ensure smooth operation of the engine while providing the minimum emissions therefrom. One of the primary disadvantages in obtaining this goal in the related art has been the inability to integrate or effectively coordinate the control of multiple engine functions, for example, the rate of fuel injection into a diesel-type engine, control of the intake throttle valve for dividing the nominal air flow in the intake air ducting to the supercharger, providing desirable control of the variable gas pocket, and providing a coordinated and integrated control of such functions while providing a closed-type control loop to ensure the best possible engine and emissions performance. The present invention overcomes some of these related art disadvantages.

SUMMARY OF THE INVENTION

The present invention is a system and method for controlling an exhaust gas recirculation system in an internal combustion engine having two or more actuating devices on a supercharger-type pressure-charged internal combustion engine, or, in a turbocharger equipped pressure-charged internal combustion engine. In the various disclosed embodiments, the actuating devices may include a variable gas pocket valve, an air intake throttle valve, an exhaust gas recirculation valve, a turbocharger back pressure valve, and/or the adjustable turbine blades in a variable gas turbine.

In one aspect, the present invention may be characterized as a closed loop control system for an engine exhaust gas recirculation system having two or more actuating devices. The disclosed control system includes a pair of actuators and a controller adapted for receiving two or more engine operating parameter inputs and providing two or more actuator control output signals. In a disclosed embodiment, the first actuator is coupled to the controller and is adapted for receiving, as an input, a first actuator control output signal from the controller which is based, in part, on the engine operating parameter inputs. The first actuator is further connected to a first actuating device, such as a bypass valve, of the exhaust gas recirculation system and is adapted for controlling the first actuating device in response to the first actuator control output signal. The disclosed embodiment also includes a second actuator coupled to the controller and having an input for receiving a second actuator control signal from the controller. As with the first actuator, the second actuator is further connected to a second actuating device of the exhaust gas recirculation system and is adapted for controlling the second actuating device in response to the second actuator control output signal. The second actuator control output signal is generated by the controller based on a variance signal or similar such feedback from the first actuator together with the engine operating parameter inputs. Using the feedback, the first and second actuators are operatively coupled. In other words, the second actuator is responsive to the first actuator when the first actuator command signal exceeds prescribed actuator limits. However, when the first actuator is commanded or operating within the prescribed actuator limits, the variance or feedback signal is zero and the second actuator operates more or less independently of the first actuator.

The present invention may also be characterized as a method of controlling an exhaust gas recirculation system having two or more cooperatively controlled actuating devices. The disclosed method involves the steps of: (1) receiving two or more engine operating parameter inputs; (2) producing an actuator command signal in response to the engine operating parameter inputs; (3) producing an actuator control output signal based on the actuator command signal and prescribed actuator angle limits which are based, in part, on the engine operating parameter inputs; and (4) controlling the first actuator in response to the actuator control output signal. The disclosed method further includes the steps of: (5) producing an actuator variance signal through the comparison of the actuator control output signal and the actuator command signal; (6) producing a second actuator control output signal based on the variance signal and the engine operating parameter inputs wherein the second actuator is controlled in response to the second actuator control output signal. Using the presently disclosed method, the first and second actuators are cooperatively controlled in that the second actuator is actively controlled when the first actuator command signal exceeds the prescribed actuator limits thereby producing a variance signal. When the first actuator is operating within the prescribed limits, the variance signal is zero (i.e. control output signal is equal to command signal) and the second actuator operates independently of the first actuator.

These and other aspects, features and advantages of the present invention will become apparent to those skilled in the art upon a reading of the following detailed description when taken in conjunction with the drawings wherein there is shown and described illustrative embodiments of the invention.

DESCRIPTION OF THE PREFERRED EMBODIMENT

The following description is of the best mode presently contemplated for carrying out the invention. This description is not to be taken in a limiting sense, but is made merely for the purpose of describing the general principals of the invention. The scope and breadth of the invention should be determined with reference to the claims.

Figure 1:
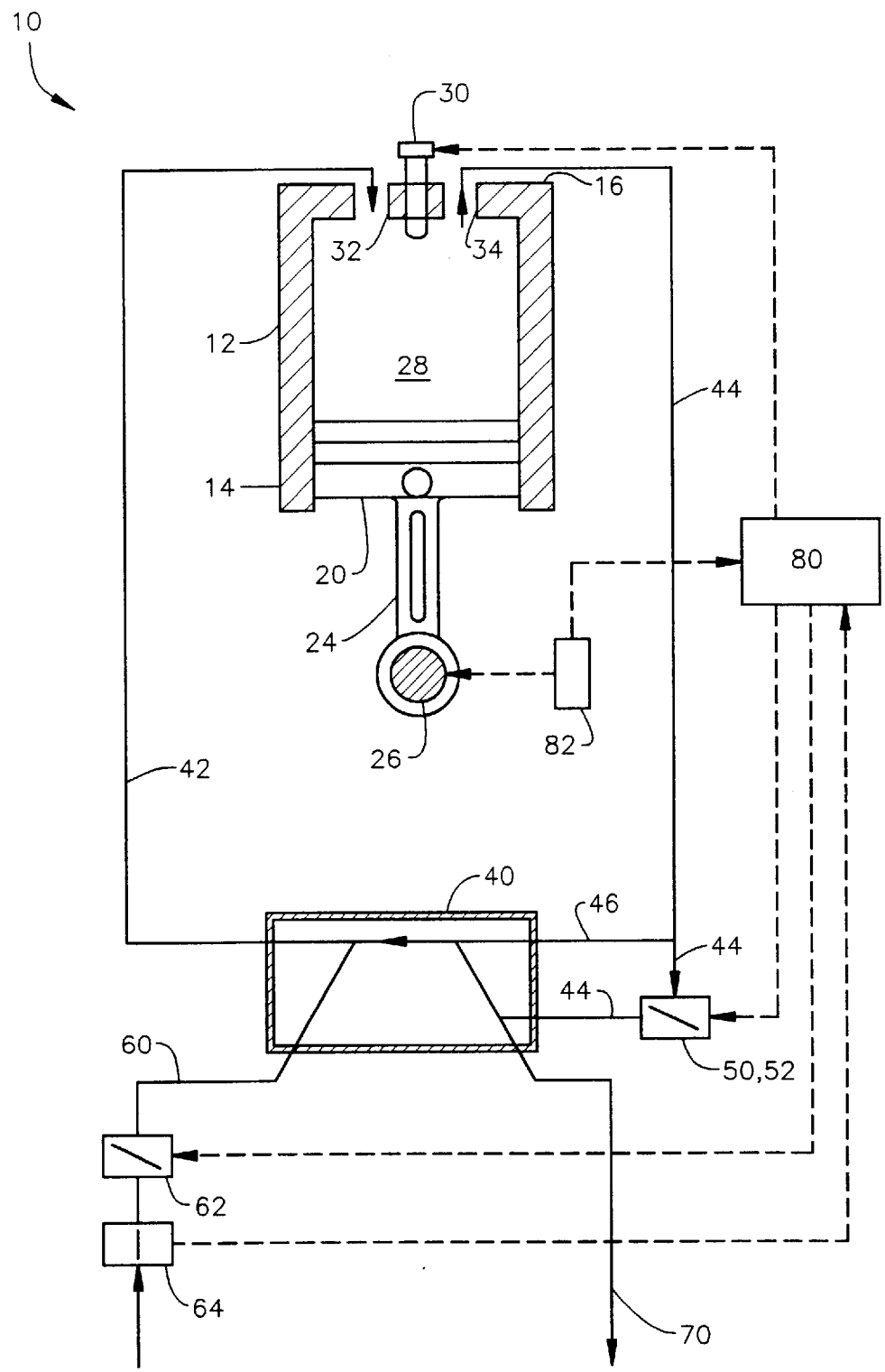
FIG. 1 discloses schematically an exhaust gas recovery feedback system according to the present invention as employed in a representative reciprocating-piston type internal combustion engine having a pressure wave supercharger and the system cooperatively controls the variable gas pocket valve in conjunction with the intake air throttle valve.
Figure 2:
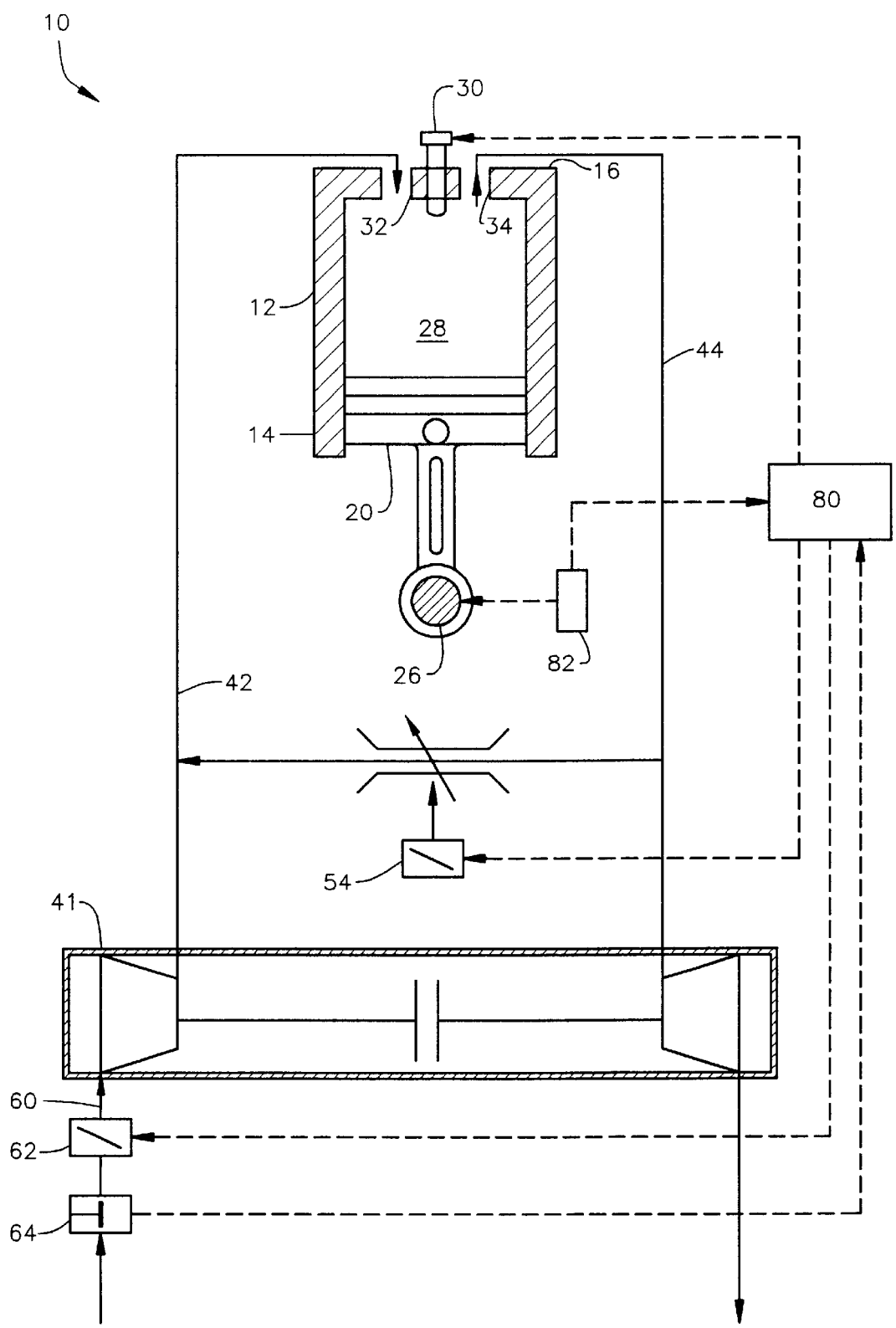
FIG. 2 discloses an alternate embodiment of an exhaust gas recovery feedback system employed in a representative reciprocating-piston type internal combustion engine having a turbocharger as the air intake pressurizing device wherein the system cooperatively controls an exhaust gas recirculation valve in conjunction with the intake air throttle valve.
Figure 3:
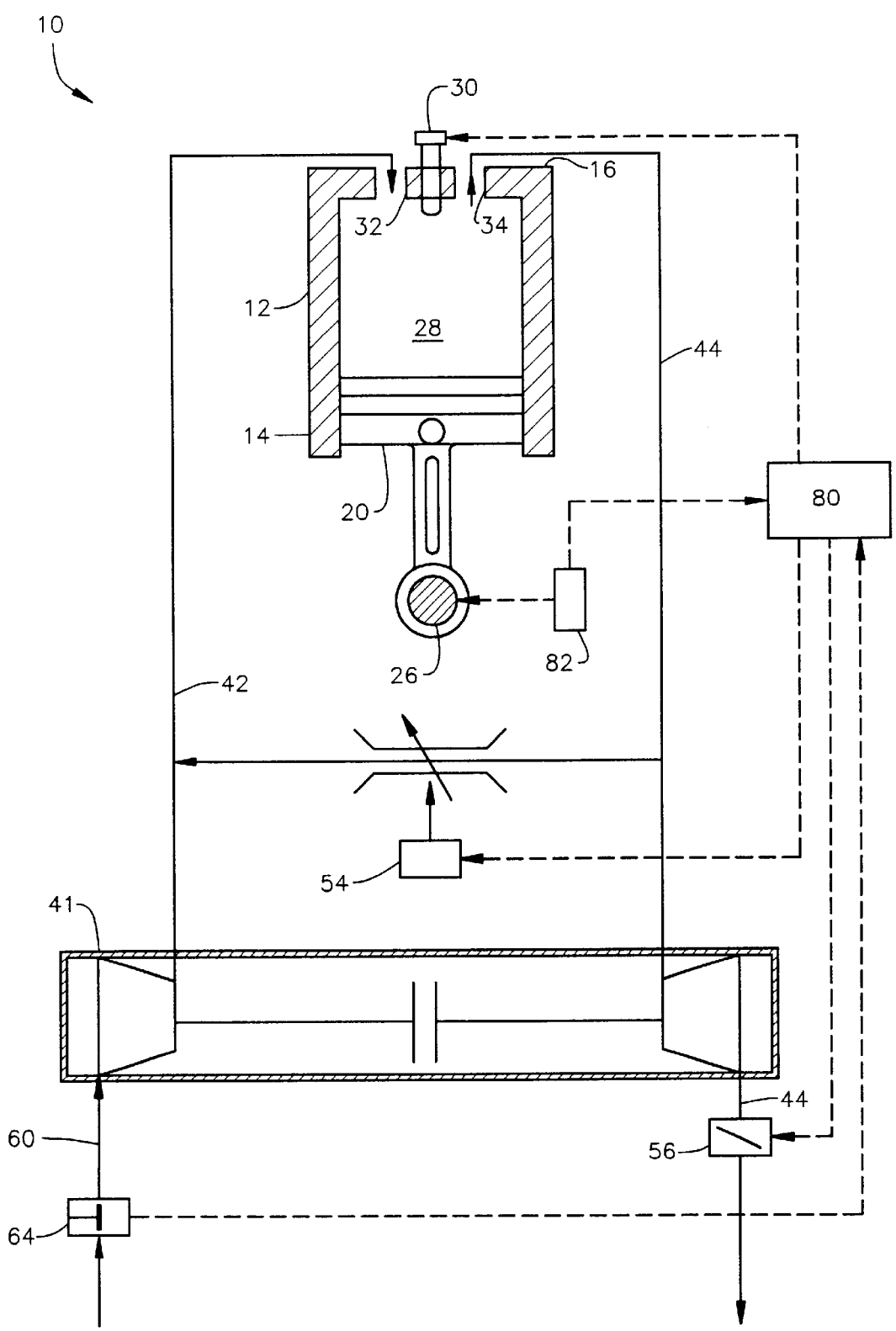
FIG. 3 discloses yet another embodiment of an exhaust gas recovery feedback system employed in a representative reciprocating-piston type internal combustion engine having a turbocharger as the air intake pressurizing device and wherein the system cooperatively controls an exhaust gas recirculation valve in conjunction with the turbocharger back pressure valve.

Referring now to the drawings, and particularly FIGS. 1 through 3, there are shown a schematic representations of a single-cylinder reciprocating-piston type internal combustion engine incorporating the present invention and referred to generally by reference numeral 10.

In each of the referenced FIGS., the exemplary engine 10 includes an engine block 12 having a cylindrical cylinder wall 14 and a cylinder head 16 acting as a closure on one end thereof. A cylindrical piston 20 disposed within the cylinder wall 14 of the engine block 12 operates reciprocally within the cylinder wall 14. The piston 20, the cylinder wall 14, and the cylinder head 16 cooperate to define a combustion chamber of varying volume within the engine 10 for the burning of a fuel-air mixture therein.

The piston 20 is connected by piston connecting rod 24 to a crankshaft 26. The crankshaft includes offset crankshaft portion for translating the linear reciprocating motion of the piston 20 into rotary motion to provide a power means for obtaining power output from the engine 10, and further for translating rotary motion of the crankshaft 26 into reciprocating motion of the piston 20 during those portions of the engine cycle when the piston 20 is not power producing.

A fuel injector 30 extends through an aperture in the cylinder head 16 for providing a controlled, intermittent spray of atomized fuel into the combustion chamber for mixing with intake air during a compression stroke of the piston 20. A controlled intermittent flow of pressurized intake air into the combustion chamber is permitted through a typically valved intake aperture 32, and a controlled intermittent flow of exhaust gases and combustion byproducts is permitted through a typically valved exhaust aperture 34.

Those skilled in the art will recognize that additional components are typically included in such an engine 10 as is exemplified herein. Other apparatus associated with such an engine 10 includes intake valves, exhaust valves, mechanism for operating such valves, mechanism for lubricating and tooling the engine 10, and other apparatus. It is believed that those skilled in the art are well acquainted with such apparatus and will be readily able to select such apparatus as is necessary to the satisfactory construction and operation of an engine 10. No particular form of type of such associated apparatus is necessary to the operation of the engine 10 other than that which is commonly employed in the art, and therefore such apparatus is not further discussed herein. Furthermore, of course, the subject invention is to be understood as applicable with equal suitability to multiple cylinder engines. Therefore, the engine 10 as set forth herein should be considered as exemplary and not limiting.

The engine 10 includes an intake air flow path 42, which is typically an intake air manifold (not shown), for transporting intake air to the intake aperture 32, and an exhaust gas flow path 46 for transporting exhaust gases from the exhaust gas aperture 34. The exhaust gases are transported to an intake air pressurizing device 40. The intake air pressurizing device 40 is operated by the relatively high pressure of the exhaust gases and under the influence thereof, operably compresses intake air received at ambient pressure. The intake air pressurizing device 40 is in flow connection with the intake air flow path 42 and directs the pressurized intake air therethrough for supplying pressurized intake air to the intake aperture 32.

As illustrated in FIG. 1, the intake air pressurizing device is preferably a gas-dynamic pressure-wave supercharger 40, as described above. The intake air pressurizing device 40 further is operatively associated with an exhaust gas bypass 44 and a bypass valve, preferably a variable gas pocket valve 50. The exhaust gas bypass 44 is in flow communication with the exhaust gas flow path 46 for receiving a portion of the exhaust gas flow therethrough and selectively controlling a flow of exhaust gas through the exhaust gas bypass 44 in a volumetric flow as controlled by the variable gas pocket valve 50. The exhaust gas bypass 44 and variable gas pocket valve 50 direct a portion of exhaust gas into the intake air pressurizing device 40 and out to the exhaust gas discharge path 70. The remaining volume of exhaust gas flows drives the intake air pressurizing device 40 where the portion of the remaining volume of the exhaust gas is mixed with the incoming air for recirculation through the engine 10.

The engine 10 is further provided with an ambient air intake path 60 for permitting a flow of ambient air into the intake air pressurizing device 40. An intake air throttle valve 62 is disposed in the ambient air intake path 60 for throttling the volumetric flow of air through the ambient air intake path 60, and an intake air mass flow sensor 64 is also provided in the ambient air intake path 60 for measuring the air mass flow rate through the ambient air intake path 60. The engine 10 is also provided with an exhaust gas discharge path 70 for permitting the escape of the remaining exhaust gas from the intake air pressurizing device 40.

An engine controller 80 is provided on the engine 10. The engine controller 80, as is known to those skilled in the art, will typically contain means for controlling the operation of the engine 10 in response to sensed measurements of various operating parameters of the engine 10 as provided to the controller 80 by various sensors disposed on and in conjunction with the engine 10. As it relates to the present invention, the controller 80 is provided with a means for sensing the operating speed and load of the engine by way of the crankshaft 26, typically an engine operation sensor 82 for indicating the instant rotational speed in terms of revolutions per minute of the engine crankshaft 26, or similar such engine operation sensor 82 for indicating engine operating parameters, as is generally known to those skilled in the art. The engine controller 80 is also adapted for controlling the fuel injector 30 to control the quantity, timing, and duration of fuel injected into the combustion chamber of the engine 10. The controller 80 is also connected to the intake air mass flow sensor 64 for receiving a measurement of intake air mass flow. Finally, the controller 80 is connected to the variable gas pocket valve 52 and to the intake air throttle valve 62 for selectively and cooperatively controlling the variable gas pocket valve 52 and the intake air throttle valve 62 so as to control the intake air mass flow in response to the sensed mass flow rate and the sensed crankshaft rotation rate, and to control the mass flow rate of the exhaust gas recirculated through the exhaust gas bypass 44 by selective actuation of the variable gas pocket valve 52 in conjunction with the intake air throttle valve 62.

The engine controller 80 is a processor based device or means for providing closed loop control of an exhaust gas recovery feedback system of the engine 10, providing independent and simultaneous closed loop control of the variable gas pocket control 52 and the intake throttle valve 62. In its preferred mode of operation, the controller 80 actuates the variable gas pocket controller to its maximum volumetric flow rate condition prior to actuating the intake air throttle valve 62 thereby maximizing recirculation of exhaust gas to the combustion chamber and minimizing fuel consumption. As the load demand on the engine 10 increases, the controller 80 continuously actuates the variable gas pocket valve 52 and the intake air throttle valve 62 to cause a continuous transition of control from the variable gas pocket valve 52 or first actuating device to the intake air throttle valve 62 or second actuating device. This cooperative control of both the variable gas pocket valve 52 and the air throttle valve 62 permits the controller 80 to function as a closed loop controller on these elements, for permitting a control of the exhaust gas recirculation rate through the exhaust gas bypass 44 in all operating modes of the engine 10.

The embodiments of FIGS. 2 and 3 are very similar from a structural and operation standpoint, to the embodiment of FIG. 1. The notable differences include the intake air pressurizing device 40 and the controlled actuating devices. The principle of operation, however, are quite similar for all embodiments. For example, in the embodiments illustrated in FIGS. 2 and 3, the intake air pressurizing device is preferably an exhaust gas driven turbocharger 41 wherein the first actuating device (i.e. bypass valve) is an exhaust gas recirculation valve 54 operatively associated with an exhaust gas bypass conduit 44. The embodiment of FIG. 2 contemplates using an air intake throttle valve 62 as the second actuating device whereas the embodiment of FIG. 3 contemplates using a turbocharger back pressure valve 56 as the second actuating device. The disclosed system is equally adaptable to numerous other multiple actuating exhaust gas recirculation systems wherein the actuating devices may include, for example, devices such as the adjustable blades in variable gas turbines.

Figure 4:
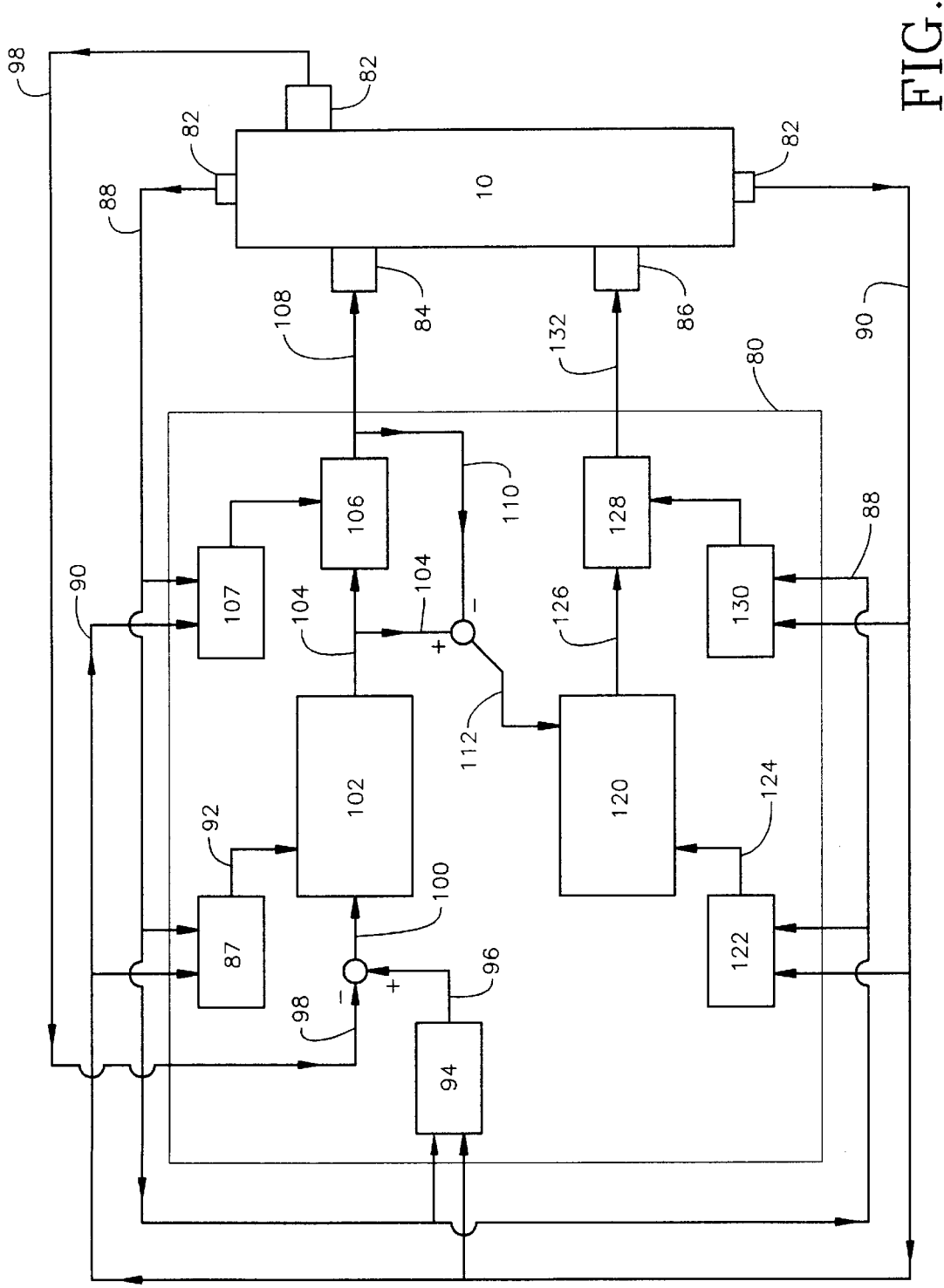
FIG. 4 is a general block diagram of the closed loop exhaust gas recirculation control system in accordance with the principles of the present invention.

Referring now to FIG. 4, there is shown a functional block diagram of the preferred closed loop control system, generally designated by the numeral 81. As illustrated, the closed loop control system 81 is operatively coupled to a pair of actuators 84, 86 for controlling the operation selected mechanisms such as air flow valves associated with the engine 10. In the illustrated embodiment, the actuators 84, 86 are operatively coupled to a variable gas pocket valve 52 and an air intake throttle valve 62 of the engine, respectively. It should be noted however, that the present closed loop control system 81 is equally adaptable for use with other actuators and associated mechanisms including, but not limited to, exhaust gas recirculation valves and actuators, back pressure valves and actuators, and variable gas turbine actuators. The disclosed closed loop control system 81 also incorporates a feedback loop wherein one of the actuator control signal outputs is used as an input to the control of the other actuator. The closed loop control system 81 also utilizes one or more measured engine operating parameters as input signals. In the present embodiment, the closed loop control system 81 utilizes measured parameters such as the measured air mass flow through the engine, engine speed, and fuel mass. Similar such engine operating parameters such as engine operating temperatures, coolant temperatures, air intake temperatures, throttle position, and the like, can also be used.

In the illustrated embodiment, the closed loop control system 81 operates by determining a variable gas pocket (VGP) valve target position 87 based on selected engine operating parameters such as the measured engine speed 88 and the desired fuel mass 90. The variable gas pocket (VGP) valve target position 87 or feed forward VGP actuator angle is then converted to a VGP actuator voltage signal 92. Concurrently, the desired air mass flow 94 is calculated using the measured engine speed 88 and the fuel mass 90 as inputs. The desired air mass flow value 94, expressed in terms of lambda or the reciprocal of the equivalence ratio, is then converted to a desired air mass flow voltage signal 96 which is then compared to the measured air flow mass signal 98 to yield an air mass flow variance signal 100.

The air flow mass variance signal 100 together with the VGP actuator voltage signal 92 are forwarded to the VGP controller 102 for determining the commanded VGP actuator signal 104. The commanded VGP actuator signal 104 is forwarded to a VGP limiter 106 which adjusts, if necessary, the commanded VGP actuator signal 104 to fall within prescribed angle limits 107. The prescribed angle limits 107 are preferably determined using various engine operating parameters such as the aforementioned engine speed 88 and fuel mass 90 parameters. The adjusted or corrected VGP actuator signal 108 is then forwarded to the VGP actuator 84 thereby commanding the variable gas pocket valve 52 to the appropriate position.

A feedback signal 110, representing the corrected VGP actuator signal, is then compared to the commanded VGP actuator signal 104 to yield a VGP actuator variance signal 112. Any variance between the corrected VGP actuator signal 108 and the commanded VGP actuator signal 104 is embodied in the VGP actuator variance signal 112 which is used as an input to the intake throttle valve controller 120. Concurrently, the closed loop control system 81 is also determining an intake throttle valve target position 122 based on the selected engine operating parameters such as the measured engine speed 88 and the desired fuel mass 90. The intake throttle valve target position 122 or feed forward intake throttle actuator angle is converted to an intake throttle actuator voltage signal 124 which, along with the VGP actuator variance signal 112, are input to the intake throttle valve controller 120 for purposes of determining the commanded intake throttle actuator signal 126. The commanded intake throttle actuator signal 126 is forwarded to an intake throttle limiter 128 which adjusts, as required, the commanded intake throttle actuator signal 126 to within prescribed angle limits 130. As with the VGP limiter, the prescribed angle limits 130 for the intake throttle actuator 86 are preferably determined using various engine operating parameters such as the engine speed 88 and fuel mass 90 parameters. The corrected intake throttle actuator signal 132 is forwarded to the intake air throttle actuator 86 thereby commanding the intake air throttle valve 62 to the appropriate position.

Having commanded the VGP actuator 84 and intake throttle actuator 86 to the desired positions, within the engine 10, the air flow mass and other engine operating parameters are measured to yield the new inputs for the closed loop control system 81. In this manner, the closed loop control system 81 operates in a continuous manner.

It can be seen that the subject invention provides a number of advantages including a reduction of fuel consumption for the engine 10 for a given load. An additional advantage is a superior control of the emission of undesirable exhaust gas byproducts from the exhaust gas discharge 70, due to the fact that the variable gas pocket valve 52 is employed as the primary actuator for air flow within the engine 10, with the intake air throttle valve 62 providing a secondary and complementary control of the intake air mass flow rate. This permits the exhaust gas recirculation rate to be controlled by the controller 80 across the entire operating range of the engine 10.

From the foregoing, it should be appreciated that the present invention thus provides a control system and apparatus for exhaust gas recovery system in an internal combustion engine. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. A closed loop control system for an exhaust gas recirculation system having two or more actuating devices, said control system comprising:

an engine controller adapted for receiving two or more engine operating parameter inputs and providing two or more actuator control output signals;

a first actuator coupled to said engine controller and having an input for receiving a first actuator control output signal from said engine controller, said first actuator further connected to a first actuating device of said exhaust gas recirculation system and adapted for controlling said first actuating device in response to said first actuator control output signal;

a second actuator coupled to said engine controller and having an input for receiving a second actuator control output signal from said engine controller, said second actuator further connected to a second actuating device of said exhaust gas recirculation system and adapted for controlling said second actuating device in response to said second actuator control output signal; and a feedback loop operatively coupling said control signals associated with said first actuator with said second actuator, and wherein said engine controller is adapted to generate said second actuator control output signal based on said engine operating parameter inputs and said control signals associated with said first actuator.

2. The closed loop control system of claim 1 wherein said first actuating device is a variable gas pocket valve.

3. The closed loop control system of claim 2 wherein said second actuating device is an air intake throttle valve.

4. The closed loop control system of claim 1 wherein said first actuating device is an exhaust gas recirculation valve.

5. The closed loop control system of claim 4 wherein said second actuating device is an air intake throttle valve.

6. The closed loop control system of claim 4 wherein said second actuating device is a turbocharger back pressure valve.

7. The closed loop control system of claim 4 wherein said second actuating device is a variable gas turbine.

8. The closed loop control system of claim 1 wherein said engine controller includes a processor and wherein said processor is adapted for generating a feed forward command for said first actuator based on said engine operating parameter inputs.

9. The closed loop control system of claim 8 wherein said processor is further adapted for generating a first actuator command signal based on said feed forward command and said engine operating parameter inputs.

10. The closed loop control system of claim 9 wherein said processor is further adapted for generating prescribed actuator limits based on said engine operating parameter inputs, and wherein said prescribed actuator limits are used to adjust said first actuator command signal to yield said first actuator control output signal.

11. The closed loop control system of claim 9 wherein said processor is further adapted for determining a variance between said first actuator command signal and said first actuator control output signal.

12. The closed loop control system of claim 11 wherein said processor is further adapted for generating said second actuator control output signal based on said variance between said first actuator command signal and said first actuator control output signal.

13. The closed loop control system of claim 12 wherein said processor is further adapted for generating a feed forward command for said second actuator based on said engine operating parameter inputs.

14. The closed loop control system of claim 13 wherein said processor is further adapted for generating said second actuator control output signal based on said variance between said first actuator command signal and said first actuator control output signal and said feed forward command for said second actuator.

15. The closed loop control system of claim 12 wherein said processor is further adapted for generating prescribed actuator limits for said second actuator based on said engine operating parameter inputs, and wherein said prescribed actuator limits for said second actuator are used to adjust said second actuator control output signal.

16. A method of controlling an exhaust gas recirculation system having two or more cooperatively controlled actuating devices, said method comprising the steps of:

receiving two or more engine operating parameter inputs producing a first actuator command signal in response to said engine operating parameter inputs;

producing a first actuator control output signal in response to said first actuator command signal and one or more first actuator signal limits wherein said first actuator signal limits are determined based on said engine operating parameter inputs;

controlling a first actuator in response to said first actuator control output signal;

producing a first actuator control variance signal through the comparison of said first actuator control signal and said first actuator command signal;

producing a second actuator control output signal in response to said first actuator control variance signal and said engine operating parameter inputs; and controlling a second actuator in response to said second actuator control output signal.

17. The method of controlling an exhaust gas recirculation system as set forth in claim 16 wherein said first actuating device is a variable gas pocket valve.

18. The method of controlling an exhaust gas recirculation system as set forth in claim 17 wherein said second actuating device is an intake air throttle valve.

19. The method of controlling an exhaust gas recirculation system as set forth in claim 16 wherein said first actuating device is an exhaust gas recirculation valve.

20. The method of controlling an exhaust gas recirculation system as set forth in claim 19 wherein said second actuating device is an intake air throttle valve.

21. The method of controlling an exhaust gas recirculation system as set forth in claim 19 wherein said second actuating device is a turbocharger back pressure valve.

22. The method of controlling an exhaust gas recirculation system as set forth in claim 19 wherein said second actuating device is a variable gas turbine.

23. The method of controlling an exhaust gas recirculation system as set forth in claim 16 further comprising the step of determining a first actuator feed forward command signal based on said engine operating parameter inputs and wherein said step of producing said first actuator command signal further comprises producing said first actuator command signal in response to said engine operating parameter inputs and said first actuator feed forward command signal.

24. The method of controlling an exhaust gas recirculation system as set forth in claim 16 further comprising the step of determining a second actuator feed forward command signal based on said engine operating parameter inputs and wherein said step of producing said second actuator control output signal further comprises the step of producing said second actuator control output signal in response to said first actuator control variance signal and said second actuator feed forward command signal.

* * * * *